March 21, 1967 W. F. HANNON 3,309,810
CASTING MECHANISM FOR A FISHING ROD
Filed Sept. 9, 1965 2 Sheets-Sheet 2
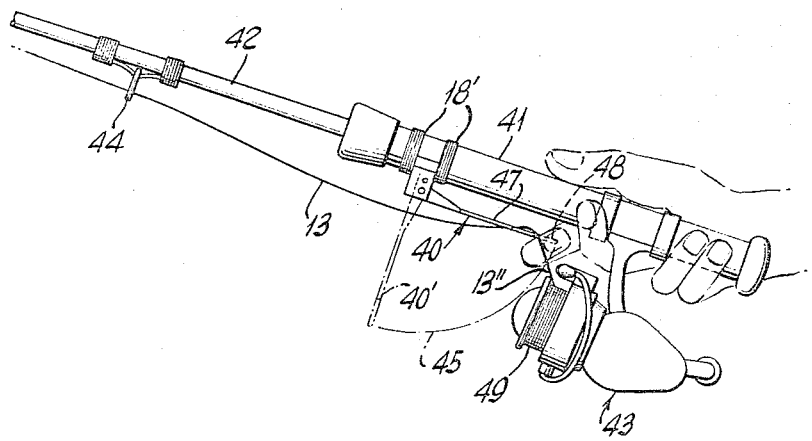
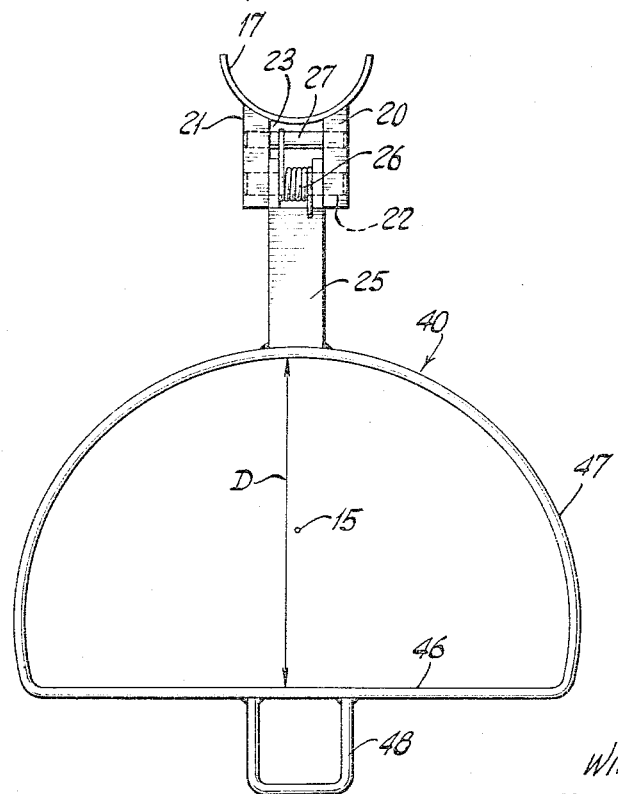
INVENTOR
WILLIAM F. HANNON
BY
Hopgood & Calimafde
ATTORNEYS

United States Patent Office 3,309,810
Patented Mar. 21, 1967

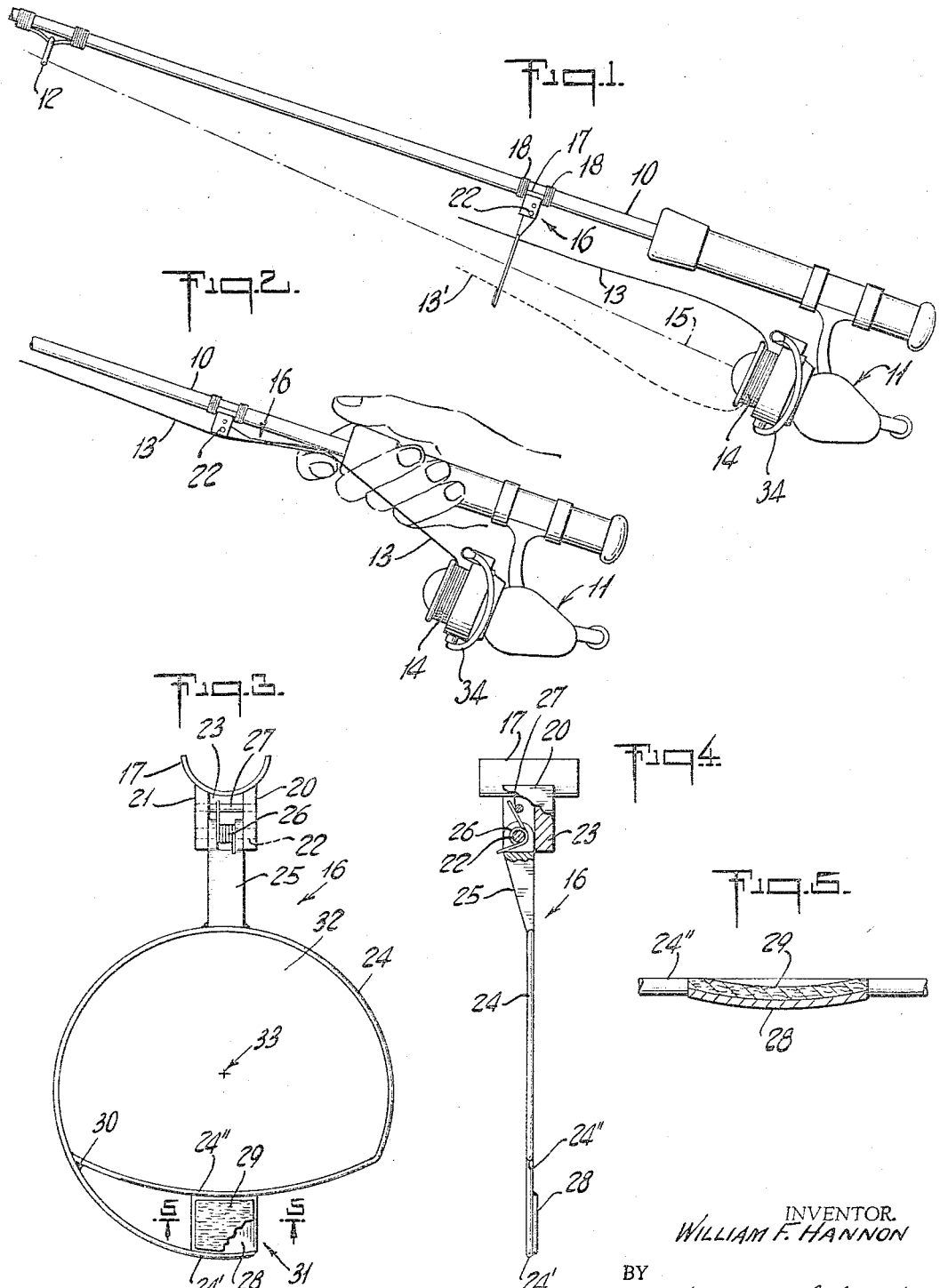

3,309,810
CASTING MECHANISM FOR A FISHING ROD
William F. Hannon, 1449 Farmington Ave.,
Berlin, Conn. 06037
Filed Sept. 9, 1965, Ser. No. 492,971
15 Claims. (Cl. 43—24)

My invention relates to a fishing rod of the type used for casting and has particular application to use with a spinning-reel equipped rod, and this application is a continuation-in-part of my application Ser. No. 364,200, filed May 1, 1964, now abandoned.

It is an object to provide an improved rod and reel combination for casting.

A specific object is to produce an improved quick-release guide and brake for the line of a fishing rod equipped for spin-casting.

It is a general object to meet the above objects with a structure which is readily installed on existing equipment, which is simple and positive in operation, which enables longer and more accurate casting, which avoids finger contact with the line during casting, and which provides minimum drag while guiding the line payed-out from a spinning reel during casting.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a fragmentary side elevation of a fishing rod equipped with a quick-release guide and brake of my invention, with the parts in the guide position;

FIG. 2 is a view similar to FIG. 1 with the parts in the braking position;

FIG. 3 is an enlarged view in elevation of the guide and brake assembly, before mounting to a rod;

FIG. 4 is a partly broken-away right-end view of the assembly of FIG. 3;

FIG. 5 is an enlarged sectional view in the plane 5—5 of FIG. 3;

FIG. 6 is a view similar to FIG. 2 to illustrate employment of a modified quick-release device of my invention; and FIG. 7 is an enlarged view in elevation of the quick-release device of FIG. 6, before mounting to a rod.

Briefly stated, the invention contemplates achieving the foregoing objects with a light-weight frame hingedly supported on the rod between the reel and the first guide-eye. In a first position, the frame presents a large generally circular guide opening for line passing from the reel to the first eye, and in a second position the frame is alongside the rod. In one form, braking action is achieved by pinching the line between part of the frame and the rod; in another form, brake action is inherent in the physical relation of the hinged frame with respect to the reel.

Referring to FIGS. 1 to 5 of the drawings, the invention is shown in application to a rod 10 equipped with a spinning reel 11 and having plural spaced guide eyes, of which the eye 12 is most closely adjacent the reel 11. A supply of line 13 is carried by the spool 14 of reel 11, and during payout the locus of line 13 (between spool 14 and eye 12) is generally in the surface of a bowed cone, having an axis 15 substantially aligned with the axis of spool 14 (i.e., the spin axis).

The quick-release guide and brake of the invention is a separate assembly 16 having mounting means such as a base or shoe 17 for ready adaptability to the rod 10. The base 17 is shown as semi-cylindrical for conformity to the rod and may be simply bound, as at 18, in the desired location, between reel 11 and eye 12. The base 17 is shown to include a bracket of channel shape having spaced arms 20–21 for supporting a hinge pin 22 transverse to the rod axis; arms 20–21 are connected by the channel bottom 23, which serves as an abutment or stop, to be described.

The hinged part of the assembly 16 comprises a relatively large frame 24 which is essentially flat and is connected by a strut 25 to the hinge pin 22, between arms 20–21, the plane of frame 24 being substantially aligned with the hinge axis. The frame 24 must lend itself to fast erection from the folded position shown in FIG. 2 to the extended position shown in FIG. 1, and it is therefore preferably characterized by light weight and low moment of inertia about the hinge axis (22). At the same time, the frame 24 preferably presents a large generally circular guide opening for line 13 as it is payed-out during casting; frame 24 is thus shown as of strong wire, having a brazed connection to strut 25. To assist the shift from folded to extended position, I additionally show a coil spring 26 about pin 22 and located between spaced legs of strut 25; if desired an additional pin 27 between arms 20–21 may engage an end of spring 26, to increase its preloaded stress and ease of action, urging frame 24 to extended position (FIG. 1) with strut 25 abutting the bottom 23 of the base channel.

The opening of frame 24 may be purely circular in which case its center is preferably aligned with the axis 15 of line development during casting. However, in the form shown, greater brake efficiency and manipulative convenience are provided by a finger-engaging element or pad 28 brazed to the wire loop of frame 24 and lined on its underside by yieldable friction material 29 such as leather. In FIG. 5, the pad 28 is seen to be slightly bowed so that material 29 can be similarly bowed, for greater area of contact with rod 10 when finger-pressed against the line 13 (FIG. 2). To strengthen the connection of pad 28 to frame 24, one wire end 24' overlaps the other wire end 24" at different radii, the pad 28 being brazed to ends 24'–24" at the overlap thereof; thus the central opening shown for frame 24 in FIG. 3 may depart from a pure circle while retaining its generally circular nature, and to the extent that it departs from a circle, at 24", the departure approaches a chord and may be said to be chord-like. The end 24" is also brazed at 30 to the main loop 24, for greater strength, as will be understood. While it is true that even greater strength can be achieved by further extending the wire end 24' for brazed connection to the main loop 24, at a location symmetrical to the brazed connection 30, such construction is unnecessary and is, in fact, not preferred, in that the finger-access available from the side (designated generally 31, in FIG. 3) is found to be a great manipulative convenience, for quick finger release from pad 28.

The location of assembly 16 on rod 10 is preferably such that, when folded against rod 10 (FIG. 2), the index finger naturally grasps the pad 28 when gripping the rod for normal casting. For the frame 24 shown, and for right-handed fishermen, this means that index-finger access to pad 28 is via the opening 31, i.e., without obstruction by wire end 24'; for left-handed persons, it will be understood that frame 24 is fashioned as the mirror image of that depicted in FIG. 3, with connection 30 and access opening 31 on reversed sides of the axis 32 of general symmetry (as compared with the showing of FIG. 3). Also, the effective center 33 of the frame loop 24 is located substantially on the axis 15 of line payout, with the loop 24 confining the extent of line bowing between limits indicated at 13 (solid line) and 13' (dashed line) in FIG. 1; for a spinning-reel having an effective spool diameter of three inches, I prefer to limit line bowing within a 4-in. diameter circle at frame 24, where the distance from assembly 16 to spool 14 is about one-third the distance of eye 12 from spool 14.

In use, with lure in casting position, the frame 24 is folded to the FIG. 2 position, with the hand as shown in normal casting position, the index finger compressing the line 13 between pad 28 (and liner 29) and rod 10. The caster now snaps the line pickup bail 34 to open position; this is always done with the other hand and is a normal casting requirement. During the casting swing, the index finger is easily removed at the desired instant, whereupon frame 24 is quickly erected (by spring and line tension) into extended position, for unimpeded line payout. During payout, loop 24 restricts the line from excessive bowing, thus permitting true line spinning while controlling against surplus line accumulation at eye 12, and thus making for greater uniformity of casting. At no time need one's fingers contact the line, and therefore one may cast with complete assurance against finger "burn," or scuffed or cut fingers. The prealignment of parts, and limitation to but one moving part, means assurance of positive brake, release and guide functions at all times, even for nighttime fishing.

In the arrangement illustrated in FIGS. 6 and 7, I show a form of the invention in which it is not necessary or desirable to pinch the line just prior to casting. To describe this form, it suffices to identify the hinged frame member 40 mounted by means 18 to the handle or grip portion 41 of the rod 42, at a location intermediate the spinning reel 43 and the nearest adjacent guide eye 44. The frame member 40 may be of precisely the same construction as already described for FIGS. 1 to 5, but it is mounted as close as convenient to reel 43 while still permitting free clearance for frame swinging between the finger-held position (solid outline) to the released or casting position (phantom outline 40'). This clearance is apparent from the arc 45 representing the sweep of swinging motion.

It is a feature of this modified arrangement that the length of line 13 from reel 43 to frame 40 shall be as short as possible, and that it shall be angularly offset from the normal casting alignment of line 13. This offset length of line 13 is designated 13'' in FIG. 6.

While, as indicated, it is possible to employ the frame member of FIG. 3 at 40 in FIG. 6, this is not as desirable as the employment of the preferred frame 40 of FIG. 7. This preferred form is again seen to comprise a wire defining a large flat generally circular opening of minimum lineal expanse which is at least substantially the diameter of line payout from the reel (43). However, for that localized portion of the frame which is remote from the hinge axis, I prefer to form the chord-like portion as an essentially straight portion 46, formed continuously with the arcuate portion 47, with the minimum lineal expanse D of the opening being in the order of two and one-half inches (for a typical light-weight rod and reel) or at least substantially the diameter of reel payout; as with FIG. 3, the offset of the large generally circular opening of frame 40 is preferably symmetrical with the axis 15 of line payout, during a casting operation, as suggested by identification of axis 15 in FIG. 7. A wire finger-engagement element 48 is brazed or otherwise secured to the localized portion 46. The strut and hinge-support connections for the frame 40 of FIG. 7 may be the same as in FIG. 3 and so they are identified by the same reference characters.

In use, the finger element 48 is grasped as shown in FIG. 6 to hold line 13 down (without necessarily pinching it), in readiness for casting. In this position, the offset line portion 13'' creates no tendency for premature release of the line because the line 13 was wound by bail rotation, and the wound spool 49 does not rotate. However, upon release during a casting swing of the rod, the frame 40 assumes the position 40' allowing free payout of the line 13 over the rim of spool 49, in normal spincasting fashion.

It will be seen that the essentially straight portion 46 provides the feature of enabling the automatic retention of line 13, whatever the transverse position of the line at the time frame 40 is brought into the finger-retained position, and there is absolutely no frame formation creating any tendency for the line to move sideways during the hinging operation. This assures the maximum freedom from restraint on the line as it is released, for assurance against knotting or fouling of the line during casting.

While I have described the invention in detail for the preferred forms shown, it will be understood that modifications may be made without departing from the scope of the invention as defined by the claims which follow.

I claim:
1. In combination, a fishing rod, a spin-type casting reel carried by said rod near one end thereof and having a pay-out axis extending generally along the rod, guide eyes carried by said rod at spaced locations from said reel to said other end, a line carried by said reel and threaded through said eyes, and quick-release guide means comprising a substantially flat frame having a large central opening through which said line passes between said reel and the nearest adjacent eye, said central opening being large in the lineal extent of its expanse compared to the axial extent of said opening, hinge-support means for hingedly supporting said frame in a first position with said frame extending radially away from said rod and said line passing freely from said reel to said nearest eye, the hinge axis being transverse to the rod axis and being substantially in the plane of said frame, said frame being movable about the hinge axis to a second position alongside said rod, said hinge-support means being located in such adjacency to said reel that when said frame pivots about the hinge axis, said frame clears the reel but when pivoted to said second position, the line is moved to such a steep angle radially outwardly diverging with respect to the pay-out axis that pay-out is foreclosed, whereby upon manually grasping said rod in readiness to cast, the line may be held when said frame is finger-held in said second position alongside said rod, so that said line may be released upon finger release during a casting swing of said rod, and said frame may be self-orienting to said first position through the action of its momentum, said central opening being defined in part by a chord-like edge substantially parallel to the hinge axis and on the side of the opening remote from the hinge axis, whereby the mere folding of said frame along the rod will retain the line against release until the frame is released, as during a casting swing of said rod.

2. In combination, a fishing rod, a spinning reel carried by said rod near one end thereof and having a pay-out axis extending generally in the direction of said rod, guide eyes carried by said rod at spaced locations from said reel to said other end, a line carried by said reel and threaded through said eyes, and quick-release guide means comprising a substantially flat wire frame defining a large continuous generally circular opening through which said line passes between said reel and the nearest adjacent eye, mounting means holding said frame to said rod in radially extended position with the spinning cone of said line passing through said opening, said mounting means including hinge-support means for hingedly supporting said frame in said extended position, said mounting means also including spring means urging said frame to said extended position, the hinge axis being transverse to the rod axis and substantially in the plane of said frame and said frame being movable about the hinge axis to a position alongside said rod, said mounting means being located in such adjacency to said reel that when said frame pivots about the hinge axis said frame clears said reel but when moved to said position alongside said rod, the line is positioned at such a steep angle radially outwardly diverging with respect to the pay-out axis that pay-out is foreclosed, whereby upon manually grasping said rod in readiness to cast, the line may be held when said frame is finger-held in said position alongside said rod, so that said line may be released upon finger release during a casting swing of said rod, and said frame may be self-orienting to said extended position.

3. The combination of claim 2, in which the effective diameter of said opening is at least as large as substantially the line-discharge diameter of said reel.

4. A quick-release assembly for a spinning-reel-equipped fishing rod, comprising a generally flat circular open frame member and a base member hingedly connected at a location outside the opening of said frame member, said base member being adapted for mounting on a rod with the hinge axis transverse to the rod axis, and a finger lug carried by said frame member outside the opening and remote from the hinge axis and projecting radially outwardly of the axis of the opening.

5. A quick-release assembly for a spinning-reel-equipped fishing rod, comprising a generally circular open frame member and a base member hingedly connected at a location outside the opening of said frame member, said base member being adapted for mounting on a rod with the hinge axis transverse to the rod axis, said frame member comprising a circular loop of wire with ends overlapping at different radii, the overlap being remote from the hinge axis, and a finger-engagement element carried by said frame member and secured to both said wire ends in the region of overlap.

6. In combination, a fishing rod, a spinning reel carried by said rod near one end thereof, guide eyes carried by said rod at spaced locations from said reel to said other end, a line carried by said reel and threaded through said eyes, and quick-release guide means comprising a substantially flat wire frame defining a large continuous generally circular opening through which said line passes between said reel and the nearest adjacent eye, mounting means holding said frame to said rod in radially extended position with the spinning cone of said line passing through said opening, said mounting means including hinge-support means for hingedly supporting said frame in said extended position, the hinge axis being transverse to the rod axis and said frame being movable about the hinge axis to a position alongside said rod, said mounting means being in such adjacency to said reel that when said frame is swung there is a close clearance with said reel so that in said position alongside said rod the line is positioned at a relatively steep angle to the reel and pay-out is thus foreclosed, whereby upon manually grasping said rod in readiness to cast, said frame may be finger-held with the line held substantially offset from its normal casting alignment, so that said line may be released upon finger release during a casting swing of said rod, and said frame may be self-orienting to said extended position through the action of its momentum.

7. The combination of claim 6, in which said frame hinges sufficiently when finger-held to enable pinching of said line between said frame and a part of said rod.

8. The combination of claim 6, in which that localized portion of said generally circular opening which is remote from said hinge is formed generally parallel to the hinge axis.

9. The combination of claim 8, in which said localized portion is essentially straight.

10. The combination of claim 8, in which said localized portion is generally an outwardly bowed arc of substantially larger radial extent than the remainder of said frame opening.

11. The combination of claim 8, in which said localized portion is generally straight and the remainder of said frame opening is a circular arc of extent greater than 180 degrees.

12. In combination, a fishing rod, a casting reel carried by said rod near one end thereof, guide eyes carried by said rod at spaced locations from said reel to said other end, a line carried by said reel and threaded through said eyes, and quick-release guide means comprising a substantially flat frame having a large central opening through which said line passes between said reel and the nearest adjacent eye, said central opening being large in the lineal extent of its expanse compared to the axial extent of said opening, hinge-support means for hingedly supporting said frame in a first position with said frame extending radially away from said rod and said line passing freely from said reel to said nearest eye, the hinge axis being transverse to the rod axis and said frame being movable about the hinge axis to a position alongside said rod, whereby upon manually grasping said rod in readiness to cast, said frame may be finger-held with the line held substantially offset from its normal casting alignment, so that said line may be released upon finger-release during a casting swing of said rod, and said frame may be self-orienting to said first position through the action of its momentum, said hinge-support means including abutment means engaging said frame at said first position to arrest hinged movement of said frame during a casting swing, and preloaded spring means coacting between said frame and said hinge-support means and normally urging said frame into said first position and against said abutment means.

13. A quick-release assembly for a spinning-reel-equipped fishing rod, comprising a generally circular open frame member and a base member hingedly connected at a location outside the opening of said frame member, said base member being adapted for mounting on a rod with the hinge axis transverse to the rod axis, said frame member comprising a generally circular loop of wire, with that localized portion of said opening which is remote from said hinge being formed generally parallel to the hinge axis, and a finger-engagement element carried by said frame member at said localized portion and projecting radially outwardly of the axis of said opening.

14. The combination of claim 13, in which said localized portion is essentially straight.

15. The combination of claim 13, in which said localized portion is generally an outwardly bowed arc of substantially larger radial extent than the remainder of said frame opening.

References Cited by the Examiner

UNITED STATES PATENTS

| 2,065,153 | 12/1936 | Proudfit | 43—25 |
| 2,546,559 | 3/1951 | Nix | 242—84.5 |
| 2,872,751 | 2/1959 | Mayfield | 43—24 |

FOREIGN PATENTS

| 953,359 | 5/1949 | France. | |

ALDRICH F. MEDBERY, *Acting Primary Examiner.*

SAMUEL KOREN, *Examiner.*

W. H. CAMP, *Assistant Examiner.*